United States Patent [19]

Lindl

[11] 4,272,320

[45] Jun. 9, 1981

[54] HIGH DENSITY LASER-DRIVEN TARGET

[75] Inventor: John D. Lindl, San Ramon, Calif.

[73] Assignee: The United States of America as represented by the United States Department of Energy, Washington, D.C.

[21] Appl. No.: 848,427

[22] Filed: Nov. 3, 1977

[51] Int. Cl.$^3$ .............................................. G21B 1/00
[52] U.S. Cl. .......................................... 176/9; 176/1
[58] Field of Search ........................................ 176/1, 9

[56] References Cited

U.S. PATENT DOCUMENTS

| 3,899,681 | 8/1975 | Beckner et al. | 176/1 |
|---|---|---|---|
| 4,034,032 | 7/1977 | Hendricks | 176/1 |
| 4,058,486 | 11/1977 | Mallozzi et al. | 176/1 |

OTHER PUBLICATIONS

Chicago Tribune, 9/19/79, Part of an Article on the H-bomb.
The "Progressive" Magazine, 11/79, pp. 14, 18, 21.
Nature, vol. 281, 10/11/79, pp. 414–415.
"Statement on the LLL Laser Fusion Program Prepared for the JCAE Heariings on Fusion" 3/11/76, Emmett, pp. 1-3.
The Wall Street Journal, 8/28/79, pp. 1, 15.
Physical Review Letters, 3/10/75, Clauser, pp. 570-574.
Sand-76-5122, 11/75, pp. 158-169.
UCRL-77042, 10/75, Lindl et al., pp. 1-16, FIGS. 1-14.
Physics Today 5/78, pp. 50-57, by C. Martin Stickley.
Nuclear Fusion vol. 15, 4/75, pp. 333-335, Kirkpatrick et al.
UCRL-50021-74, 3/75, pp. 373-395.
Nuclear Fusion vol. 15, Dec. 1975, pp. 1183, 1184, Varnum.
UCRL-50021-75, 3/76, pp. 292-294.
LA-UR-5783-MS, 11/74, Fraley et al., pp. 1-8.
Physics Today 3/75, pp. 17, 18.
JETP Lett. vol. 21, No. 2, 1/75, pp. 68-70, Afanas'ev et al.
Nuclear Fusion vol. 15, No. 5, 10/75, pp. 935-938, 10/75, Mason et al.
U.S. Code Congressional and Administrative News 1954, pp. 3466, 3467, 3480, 3532.
Legislative History of the Atomic Energy Act of 1954, vol. II, pp. 1759, 2305, 2373, 2374.
Legislative History of the Atomic Energy Act of 1954, vol. III, pp. 2849, 2859.
Fortune Dec. 1974, pp. 149, 152.
New York Times, Jan. 30, 1973, p. 21.
Nuclear Fusion vol. 10, 1970, by Linhart, pp. 211, 212, 222, 225, 226.
Popular Science, Dec. 1976, pp. 66-71, 148, 150.
Laser Focus, 5/77, p. 6.
Science vol. 188, 4/75, pp. 30-34.
Nature vol. 258, Dec. 11, 1975, pp. 512-514.
FTD-HT-66-422, 3/67, Chao et al., pp. 1-9.
Marwick, "Exploding Reactors for Power", 1/73, pp. 9, 10, 16-19, 21-34, 37, 38.
National Defense, 1978, pp. 538-584.
UCRL-50021-74, 3/75, p. 367.
Laser Focus vol. 10, No. 12, p. 40-43, 12/74, McCall et al.

Primary Examiner—Harvey E. Behrend
Attorney, Agent, or Firm—L. E. Carnahan; Roger S. Gaither; James E. Denny

[57] ABSTRACT

A high density target for implosion by laser energy composed of a central quantity of fuel surrounded by a high-Z pusher shell with a low-Z ablator-pusher shell spaced therefrom forming a region filled with low-density material.

3 Claims, 1 Drawing Figure

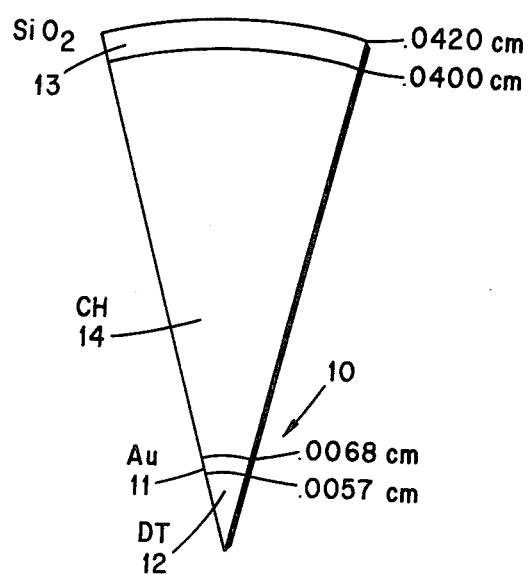

HIGH DENSITY LASER-DRIVEN TARGET

BACKGROUND OF THE INVENTION

The invention described herein was made at the Lawrence Livermore Laboratory in the course of, or under, Contract No. W-7405-ENG-48, between the United States Department of Energy and the University of California.

This invention relates to targets for implosion by an energy source, such as one or more laser beams, and more particularly to a high density laser-driven target.

In recent years much effort has been directed to inertial confinement fusion systems wherein a target is imploded by an energy source such as a laser or electron beam machine. U.S. Pat. No. 3,378,446 issued Apr. 16, 1968 to J. R. B. Whittlesey; 3,489,645 issued Jan. 13, 1970 to J. W. Daiber et al; 3,624,239 issued Nov. 30, 1971 to A. P. Fraas; 3,723,246 issued Mar. 27, 1973 to M. J. Lubin; and 3,762,992 issued Oct. 2, 1973 to J. C. Hedstrom are exemplary of these inertial confinement systems. As set forth in U.S. Pat. No. 3,723,246 to M. J. Lubin inertial confinement fusion has various utilities recognized by the scientific community as excellent sources of neutrons, x-rays, alpha particles, for example, for applications in radiography, synthetic fuel production, fissile fuel production, as well as for physics studies. The advent of inertial confinement fusion wherein a tiny fusion fuel target can be imploded in an evacuated chamber without damage to the chamber or the optics involved has provided an excellent source of neutrons, etc., at a magnitude not previously available under controlled conditions. Thus, as widely recognized by the scientific community, while fusion power for electrical production has not yet been accomplished, the inertial confinement fusion techniques thus far developed have greatly advanced the state of the art.

In addition to the systems of the above-referenced U.S. Patents, various inertial confinement fusion mechanisms for imploding the targets have been developed as exemplified by U.S. Pat. No. 4,017,163 issued Apr. 12, 1977, to A. J. Glass, and articles "Laser Fusion Target Illumination System" by C. E. Thomas, Applied Optics, Vol. 14, No. 6, June 1975; and "Thermonuclear Fusion Research With High-Power Lasers", Vacuum Technology, May 1975, pp 50-60 and 64, by R. R. Johnson et al.

Various target designs have been proposed in the open literature for laser, electron beam, and ion beam implosion techniques as exemplified by Report UCID-17297 "A 1964 Computer Run On A Laser-Imploded Capsule", by R. E. Kidder, Mar. 28, 1973; "Implosion, Stability, And Burn Of Multishell Fusion Targets" By G. S. Fraley et al, The Fifth I.A.E.A. Conference on Plasma Physics and Controlled Nuclear Fusion Research, Tokyo, Japan, Nov. 11-15, 1974 as Paper IAEA-CN-33/F55 (LA-UR-5783-MS); "Laser Driven Implosion of Hollow Pellets" by J. Nuckolls et al, presented at the above-referenced Fifth I.A.E.A. Conference (UCRL-75538); "Structured Fusion Target Designs" by R. C. Kirkpatrick et al, Nuclear Fusion 15, April 1975, pp. 333-335; "Target Compression With One Beam" by G. H. McCall et al, Laser Focus, Dec. 1974, pp. 40-43; "Electrically Imploded Cylindrical Fusion Targets" by W. S. Varnum, Nuclear Fusion 15, Dec., 1975, pp. 1183-1184; "The Calculated Performance Of Structured Laser Fusion Pellets" by R. J. Mason, Nuclear Fusion 15, Dec. 1975, pp. 1031-1043; "Low Power Multiple Shell Fusion Targets For Use With Electron And Ion Beams" by J. D. Lindl et al and "Stability and Symmetry Requirements of Electron and Ion Beam Fusion Targets" by R. O. Bangerter et al, both published in the Proceedings of the International Topical Conference on Electron Beam Research and Technology held Nov. 3-6, 1975, Albuquerque, N. M. (Printed Feb. 1976), SAND76-57122; and "Problems With Fuel Pellets For Laser-Induced Fusion", Physics Today, March 1975, pp. 17 and 20.

The production of fusion neutrons by inertial confinement (laser implosion) techniques was first demonstrated in May 1974, see above-referenced Vacuum Technology article by R. R. Johnson, and "Measurement of the Ion Temperature in Laser-Driven Fusion" by V. W. Slivinsky et al, Physical Review Letters, Vol. 35, No. 16, Oct. 20, 1975, pp. 1083-1085. Since that time hundreds of targets of various configurations have been imploded by lasers and electron beam machines which have verified to the satisfaction of the scientific community that neutrons are being produced from fusion reactions. Diagnostic techniques for verifying this fact are exemplified by the above-cited Physical Review-Letters by V. W. Slivinsky et al; "Pinhole imaging of Laser-Produced Thermonuclear Alpha Particles" by V. W. Slivinsky et al, Applied Physics Letters, Vol. 30, No. 11, June. 1, 1977, pp. 555-556; "Laser-Fusion Ion Temperatures Determined by Neutron Time-Of-Flight Techniques" by R. A. Lerche et al, UCRL-79375, dated April 1977; and "Implosion Experiments With $D,He^3$ Filled Microballons" by V. M. Slivinsky et al, UCRL-78450 Rev. II, dated Mar. 11, 1977. Such diagnostics have verified that the computer code "LASNEX", for example, accurately models current laser fusion experiments.

Target fabrication techniques are at an advanced state of development with numerous mechanisms and processes having been developed, as exemplified by the above-referenced U.S. Pat. No. 3,723,246 to M. J. Lubin, and U.S. Pat. No. 3,907,477, issued Sept. 23, 1975 to T. R. Jarboe et al; No. 3,985,841 issued Oct. 12, 1976 to R. J. Turnbull et al; and No. 4,012,265 issued Mar. 15, 1977 to J. A. Rinde et al. Copending U.S. Patent Application Ser. No. 609,640 filed Sept. 2, 1975, now U.S. Pat. No. 4,035,032 issued July 5, 1977, and Ser. No. 807,108, filed June 16, 1977, now U.S. Pat. No. 4,133,854 issued Jan. 9, 1979, each in the name of C. D. Hendricks, assigned to the assignee of this application, describe and claim processes for rapidly producing fusion target. In addition numerous publications such as "Spherical Hydrogen Targets for Laser-Produced Fusion" by I. Lewkowicz, J. Phys. D: Appl. Phys., Vol. 7, 1974; "Fabrication and Characterization of Laser Fusion Targets" by C. D. Hendricks et al, American Physical Society, Division of Plasma Physics, Nov. 10-14, 1975 (UCRL-76679); and report UCRL-50021-75"Laser Program Annual Report 1975", Lawrence Livermore Laboratory, Univ. of Calif., Section 7 "Target Fabricartion", distributed Nov. 1976, pp. 343-368.

Thus, while commercial fusion power reactors may be at least a decade away, the inertial confinement fusion technology has raidly advanced such that greater than $10^9$ fusion neutrons are being produced by existing implosion systems, which systems currently provide an excellent source of neutrons, x-rays, alpha particles, etc., which sources have not been previously available, in the magnitude now provided, to the scientific community for use in various recognized applications as exemplified above. In addition, other currently known applications for neutrons, x-rays etc., produced by the target of this invention have applications in the field of neutron crystallography, means of achieving crystal dislocation, initiation of some action such as a switch or random number generator upon receipt of a neutron pulse by a detector, calibration of diagnostics for other apparatus, fluor studies, and as a source of strong shock waves for high pressure testing.

With the acceptance by the scientific community that fusion neutrons have been produced by laser imploded targets, substantial effort is now being directed toward large laser systems and a prototype inertial confinement fusion reactor. As laser capabilities increase, targets capable of producing high neutron, x-ray yield must be developed, and with, for example, the 20-beam Shiva laser system targets having high densities will be utilized to increase the yield. While laser systems prior to Shiva have been capable of attaining high fuel densities or temperatures, but not both, the higher power Shiva system will be able to increase both the fuel densities and temperatures. Thus, a need exists for a high density laser-driven target.

SUMMARY OF THE INVENTION

The present invention is a high density target for inertial confinement fusion applications, and is particularly applicable for implosion by high energy lasers. Basically the target is composed of a quantity of fusion fuel surrounded by a pusher shell and having an ablator-pusher shell in spaced relation with said pusher shell defining a region therebetween which is filled with low-density material.

Therefore, it is an object of this invention to provide a high density target for inertial confinement fusion.

A further object of the invention is to provide a high density laser-driven target.

Another object of the invention is to provide a target for laser implosion utilizing a double shell geometry wherein the inner shell functions as a pusher and the spaced outer shell functions as an ablator-pusher to implode the inner shell.

Other objects of the invention will become readily apparent from the following description and accopanying drawing.

BRIEF DESCRIPTION OF THE DRAWING

The single FIGURE illustrates an embodiment of a target made in accordance with the present invention.

DETAILED DESCRIPTION

The high density target of this invention referred to hereinafter as a ball and shell target, is particularly advantageous for use with high power laser systems such as the above-referenced Shiva glass laser which provides sufficient energy for obtaining both high fuel densities and temperatures, not obtainable with other glass laser systems.

A cryogenic DT shell with 20 TW of absorbed power can give a thermonuclear yield of several times the absorbed energy if the energy can be deposited into a Maxwellian distribution of electrons on a target with a 10–100 Å surface finish. Using the laser pulses indicated in Table I, a shell of DT with an internal diameter (i.d.) of 250μ and 90μ thickness is impulsively accelerated to minimize the effects of Rayleigh-Taylor instability.

TABLE I

| TIME (SH) | POWER (WATTS) | PULSE |
|---|---|---|
| .0 | $6 \times 10^{10}$ | Constant |
| .05 | $6 \times 10^{10}$ | Power |
| .25 | $3 \times 10^{11}$ | Constant |
| .27 | $3 \times 10^{11}$ | Power |
| .3525 | $1.5 \times 10^{12}$ | Constant |
| .3675 | $1.5 \times 10^{12}$ | Power |
| .3875 | $5 \times 10^{12}$ | Linear Ramp |
| .450 | $2 \times 10^{13}$ | Constant Power |
| .470 | $2 \times 10^{13}$ | |

Its calculated performance under various physical models is given in Table II.

TABLE II

| | ENERGY ABSORBED NON-CLASSICALLY = 8.5 KJ | | | | | |
|---|---|---|---|---|---|---|
| | INPUT ENERGY = 9.3 KJ | | | | | |
| α | 3-T | 1 | 2 | 2 | 4 | 4 |
| Inhibited Conduction | NO | NO | NO | YES | NO | YES |
| Yield | 23. KJ | 8. KJ | .53 KJ | 3.28 J | .131 KJ | 1.55 J |
| $\rho^r$ MAX | .91 | .78 | .20 | .057 | .046 | .037 |
| MAX AVG. FUEL $\rho$ | 1280. | 990. | 135. | 11.7 | 9.7 | 5.6 |
| MAX AVG. FUEL TEMP | 9.2 | 5.6 | 3.2 | 1.33 | 3.5 | 1.21 |
| MAX FUEL VELOCITY (AT $\rho c$) | .77 | .76 | .72 | .38 | .65 | .38 |
| $T_e$ MAX | 4.5 | 4.3 | 4.1 | 9.5 | 4.0 | 8.7 |

If the energy is absorbed into a superthermal spectrum, the target performance is severely degraded, as shown. Recent experiments using the two beam Janus laser system are matched fairly well by a physical model that assumes an $\alpha \sim 4$ and some inhibition of electron conduction, the last column in Table II. Alpha is the ratio of the effective temperature of the superthermal electrons to that of the main body electrons. Electron conduction inhibition in these calculations is based on a model for the onset of ion-acoustic turbulence, although such inhibition could come from magnetic fields as well. As shown at the top of Table II, with a pure DT target, less than 9% (8.5) of the absorbed energy was accounted for by inverse bremsstrahlung. The rest must be accounted for by non-classical processes which produce superthermal electrons. The inverse bremsstrahlung could be enhanced both by using a higher Z ablator and by frequency doubling. The combination of these two could lead to a considerable performance improvement.

For the target compatible with the Shiva laser system, it is assumed that 10 TW of absorbed power is achievable and that only 1μ light will be available. The superthermal electrons result in a drop in the driving pressure one achieves. They also preheat the fuel which then is harder to compress. Within the constraints of this model, it is possible to pursue two lines of experiments, one which gives a larger yield but lower density than the bare DT shell, and the other which gives higher density but lower yield.

DT gas-filled glass shells, generally similar in design to the exploding pusher targets imploded by the Janus laser system, give thermonuclear yields of about ½% of the absorbed laser energy. This is much better performance than targets previously used because the laser energy is better matched to the targets size and the density-radium ($\rho r$) of the fuel is an order of magnitude higher. Mean fuel temperatures of greater than 10 keV are calculated. Such a target has the virtue of being able to tolerate large asymmetries in the absorbed energy and can be imploded without the necessity of producing a low density corona or atmosphere prior to the implosion.

An embodiment of the target of this invention, referred to as a ball and shell target, shown in the drawing, is for 10 TW absorbed power and is capable of producing high densities. Referring now to the drawing, this target comprises a ball, generally indicated at 10, composed of a shell 11 of high-Z material, such as Au, which contains a quantity of gaseous DT fuel 12, shell 11 acting as a pusher and a preheat shield; surrounding ball 10 in spaced relation is an ablator-pusher shell 13 of lower-Z, lower density material, such as $SiO_2$, defining a space containing a low-density material 14, such as CH (plastic foam), the CH serves to support the ball 10 within shell 13. By way of example, the Au pusher shell 11 has an inner radius of 0.0057 cm, an outer radius of 0.0068 cm (wall thickness of 0.0011 cm), a density of 19.3 gm/cm$^3$, and a mass of 10.46 $\mu$gm; the DT fuel has a density of 0.05 gm/cm$^3$ and a mass of 0.0388 $\mu$gm; the $SiO_2$ ablator-pusher shell 13 has an inner radius of 0.0400 cm, an outer radius of 0.0420 cm (wall thickness of 0.0020 cm), a density of 2.5 gm/cm$^3$, and a mass of 105.6 $\mu$gm; and the CH material 14 has a radial thickness of 0.0332 cm, a density of 0.02 gm/cm$^3$, and a mass of 5.33 $\mu$gm.

It is not intended to limit the target to the specific materials and parameters exemplified above in that the pusher shell 11 could also be made of high-Z materials such as uranium (U), iron (Fe) and silver (Ag) or a mixture of selected high-Z materials, (Z of 26 and above), with an inner radius ranging from 0.005 cm to 0.01 cm and an outer radius of from 0.0055 cm to 0.012 cm. In addition the pusher could have an inner layer of lower-Z material such as $SiO_2$ to act as a mandrel for fabrication purposes. The ablator-pusher shell 13 could be also composed Be, LiH, C, $CH_2$, and $B_nH_m$ (Z of 3 to 6) having an inner radius ranging from 0.03 cm to 0.05 cm, and an outer radius of from 0.04 cm to 0.0600 cm. The outer shell could also be a composite shell with an inner layer of higher-Z low density material such as TaCOH or $SiO_2$. The low-density material 14 could also be composed of any low density gas or foam having a density of $10^{-4}$ to $10^{-1}$ gm/cm$^3$. Also, the fuel 12 could vary in density from 0.01 to 0.21 gm/cm$^3$ of DT or be composed of a solid hollow shell, or be composed of other gaseous or solid fuels such as $LiD_{.5}T_{.5}$, $D_2$, or $B_nD_mT_p$. Should gaseous material be utilized as low density material 14, pusher shell 11 will be suspended within outer shell 13 by conventional support means, such as spiders, etc., well known in the art.

Using the pulse shape of Table III, mean fuel densities of the above-exemplified target approach 150 g/cc with a yield of $4 \times 10^{10}$ neutrons.

TABLE III

| TIME (SH) | POWER (WATTS) | PULSE |
|---|---|---|
| .0 | $10^{11}$ | Constant |
| .01 | $10^{11}$ | Power |
| .4 | $10^{13}$ | Constant |
| .42 | $10^{13}$ | Power |
| .43 | $5 \times 10^{12}$ | Linear |

TABLE III-continued

| TIME (SH) | POWER (WATTS) | PULSE |
|---|---|---|
| .61 | $2 \times 10^{13}$ | Ramp |

If, instead of supporting the ball 10 by the low density foam 14, as described above, it is levitated in density $10^{-4}$ g/cc gas atmosphere, the yield would be an order of magnitude higher. However, if a Maxwellian electron spectrum is generated, and a gas fill between ball 10 and shell 13 is used, then the target yields about 1/5 of breakeven.

Illumination uniformity requirements are quite severe for the ball and shell target, illustrated in the drawing, in the absence of a preformed low density corona. LASNEX calculations indicate that the implosion pressures must be uniform to $\pm 1\%$ to achieve the densities indicated above. Since asymmetries of $\pm 10$–20% in laser intensity are expected—some corona may be necessary. This could be accomplished by surrounding the ablator shell with a 0.0001 cm thick, 0.0700 inner radius shell of $SiO_2$ and filling the space with $H_2$ having a density of $10^{-4}$ gm/cm$^3$ and mass of 0.1 $\mu$gm.

A corona, or atmosphere, is a region of some thickness beyond the ablation surface that is penetrated supersonically by the energy deposited by the laser. This region allows electron conduction to smooth asymmetries in the absorbed energy before that energy is used to generate hydrodynamic motion of the target. To perform this function, the material in the corona must be raised to a high temperature. Theoretical calculations for a constant density corona, at a density just above the critical density for the laser being used, indicates that for a given thickness atmosphere, the required temperature is proportional to $\lambda^{-1}$, where $\lambda$ is the laser wavelength. Similar estimates indicate that the energy required to heat the corona is proportional to $\lambda^{-3}$ and that the shock generated by the prepulse used to heat the atmosphere is proportional to $\lambda^{-7/3}$. It is this last effect which makes use of a high density atmosphere very difficult. Certain goals, such as the implosion of a DT shell to a density of 1000 g/cc, can only be achieved if the initial shock is limited to about one megabar. But heating a 300$\mu$ thick atmosphere, as exemplified above, at the critical density of 1$\mu$ light to the required temperature results in a 40 megabar shock. For such implosions, a 2$\mu$ laser will probably be required for the early part of the implosion. Because the illustrated target, modified as above to include an atmosphere, is not a low entropy implosion and because the low density foam between ablator shell 13 and ball 10 cushions the shock, it can survive the initial large shock generated by the explosion of the atmosphere forming layer about ablator shell 13. Initial 2-D calculations indicate one can probably tolerate $\pm 10\%$ asymmetries in absorbed power using an atmosphere generated in this fashion.

The target illustrated in the drawing can also be modified in several other ways, which produces results intermediate those discussed above. For example, if a single thick glass shell is used, such as 13, the fuel will implode to higher density and low temperature than for the thin glass exploding pusher shell previously utilized. A similar effect is obtained by coating a high-Z material on the inside of the glass shell 13. Both of these get higher density than the exploding pusher glass shell but lower density than the atmosphere containing shell configuration described above.

It has thus been shown that the present invention provides a high density laser-driven target that is compatible with high power laser systems such as the Shiva glass laser whereby both higher fuel densities and temperatures can be obtained.

While particular embodiments of the invention have been illustrated and/or described, modifications will become apparent to those skilled in the art, and it is intended to cover in the appended claims all such modifications as come within the spirit and scope of the invention.

What I claim is:

1. In a system comprising means for extracting useful energy in a controlled manner from a target imploded by energy from at least one laser beam; the improvement comprising: a high density, substantially spherically configured, concentric shelled target consisting of a pusher shell consisting of Au, said pusher shell containing therein a quantity of fuel consisting of DT; an ablator-pusher shell consisting of $SiO_2$, said ablator-pusher being positioned in spaced relation about said pusher shell forming a region therebetween filled with a material consisting of plastic foam.

2. The target defined in claim 1, wherein said pusher shell has an inner radius of about 0.0057 cm and an outer radius of about 0.0068 cm, and wherein said ablator shell has an inner radius of about 0.0400 cm and an outer radius of about 0.0420 cm.

3. The target defined in claim 1, wherein said pusher shell has a density of about 19.3 gm/cm$^3$ and a mass of about 10.46 μgm, wherein said quantity of fuel has a density of about 0.05 gm/cm$^3$ and a mass of about 0.0388 μgm wherein said ablator shell has a density of about 2.5 gm/cm$^3$ and a mass of about 105.6 μgm; and wherein said plastic foam has a density of about 0.02 gm/cm$^3$ and a mass of about 5.33 μgm.

* * * * *